(12) United States Patent
Ogura

(10) Patent No.: US 7,359,739 B2
(45) Date of Patent: Apr. 15, 2008

(54) PORTABLE ELECTRONICS DEVICE

(75) Inventor: Naotsugu Ogura, Fussa (JP)

(73) Assignee: Casio Computer Co., Ltd., Tokyo (JP)

( * ) Notice: Subject to any disclaimer, the term of this patent is extended or adjusted under 35 U.S.C. 154(b) by 22 days.

(21) Appl. No.: 10/952,465

(22) Filed: Sep. 28, 2004

(65) Prior Publication Data
US 2005/0070347 A1    Mar. 31, 2005

(30) Foreign Application Priority Data
Sep. 29, 2003   (JP)   ............... 2003-338385

(51) Int. Cl.
*H04M 1/00* (2006.01)
(52) U.S. Cl. .............. 455/575.1; 455/90.3; 455/572; 455/343.1; 455/343.3; 429/34; 429/90; 429/91
(58) Field of Classification Search ............ 455/575.1, 455/90.3, 572–574, 343.1, 343.3, 566; 429/34, 429/90–91; 361/737
See application file for complete search history.

(56) References Cited

U.S. PATENT DOCUMENTS

| | | | | |
|---|---|---|---|---|
| 5,396,177 A | * | 3/1995 | Kuo et al. ................. | 324/435 |
| 5,759,712 A | * | 6/1998 | Hockaday ................... | 429/30 |
| 5,794,125 A | * | 8/1998 | Grad ........................ | 340/636.1 |
| 5,936,380 A | * | 8/1999 | Parrish ..................... | 320/101 |
| 6,326,097 B1 | * | 12/2001 | Hockaday .................... | 429/34 |
| 6,625,030 B1 | * | 9/2003 | Haixiong .................... | 361/737 |
| 6,869,708 B2 | * | 3/2005 | Kelley et al. ................ | 429/23 |
| 6,882,864 B2 | * | 4/2005 | Miyake ..................... | 455/556.1 |
| 6,955,863 B2 | * | 10/2005 | Bean et al. .................. | 429/96 |
| 7,128,106 B2 | * | 10/2006 | Becerra et al. ............. | 141/349 |
| 2004/0067412 A1 | * | 4/2004 | Shimizu et al. .............. | 429/92 |
| 2004/0086755 A1 | * | 5/2004 | Kalal ......................... | 429/19 |
| 2004/0266493 A1 | * | 12/2004 | Bahl et al. .................. | 455/574 |
| 2005/0053883 A1 | | 3/2005 | Faber | |
| 2005/0070347 A1 | * | 3/2005 | Ogura ..................... | 455/575.1 |

FOREIGN PATENT DOCUMENTS

| | | |
|---|---|---|
| CN | 1581892 A | 2/2005 |
| JP | 9-147896 A | 6/1997 |
| KR | 2001-0031301 A | 4/2001 |
| KR | 2002-0084250 A | 11/2002 |
| KR | 10-0358241 A | 1/2003 |
| KR | 2003-0037126 A | 5/2003 |
| WO | WO 00/35032 A1 | 6/2000 |

* cited by examiner

*Primary Examiner*—Sharad Rampuria
(74) *Attorney, Agent, or Firm*—Frishauf, Holtz, Goodman & Chick, P.C.

(57) ABSTRACT

A portable electronics device comprises an interior space for storing a fuel vessel, and a chassis that includes at least one transparent window opposing the interior space.

19 Claims, 13 Drawing Sheets

PORTABLE ELECTRONICS DEVICE

BACKGROUND OF THE INVENTION

1. Field of the Invention

The present invention relates to a portable electronics device, and especially to a portable electronics device that comprises a chassis which has an interior space for storing a fuel vessel and a window formed thereto.

2. Description of the Related Art

In a portable electronics device represented by for example, a portable telephone, a laptop computer, a digital camera, a wrist watch, a PDA (Personal Digital Assistance), and an electronic organizer, etc., primary battery such as an alkaline battery and a manganese dry batter, or secondary battery such as a nickel cadmium battery, a nickel hydrogen battery, or a lithium-ion battery, are used as the power source. In recent years, as shown in Japanese Patent Application KOKAI Publication No. H9-147896, a fuel cell is used by electrochemically reacting liquid fuel such as methanol, etc., with oxygen, to directly obtain electric energy from the chemical energy.

The consumption of electric power of the electronic devices using primary and secondary batteries that are recently developed, is a large amount in accordance with the improvement of the performance of the device. Therefore, the driving time of the electronic devices is becoming shorter due to insufficient amount of battery. Further, in the case of a fuel cell, because the power source is liquid fuel, in order to solve the above problems, it is necessary to carry out supplement of liquid fuel or exchange to a new fuel vessel that has an enough amount of liquid fuel accumulated, before the operation of the electronics device is effected by shortage of liquid fuel.

To effectively exchange the fuel vessel, the remaining amount of fuel has to be consecutively confirmed.

However, if an electronic sensor, etc., is loaded to detect the remaining amount of fuel, various problems such as, the device main body becoming larger, the manufacturing cost rising, and the control of detecting the accurate remaining amount becoming difficult, leading to causes for malfunction, etc., occur.

The present invention has been made in consideration of the above, and an advantage of the present invention is that the remaining amount of liquid fuel in a fuel vessel can be confirmed by a simple structure, in a portable electronics device.

SUMMARY OF THE INVENTION

A portable electronics device according to a first aspect of the present invention, comprises a chassis that includes an interior space for storing a fuel vessel, and at least one transparent window which opposes the interior space.

A portable electronics device according to a second aspect of the present invention, comprises:
an interior space for storing a fuel vessel;
at least one transparent window opposing the interior space; and
a photographing element that photographs an image.

A portable electronics device according to a third aspect of the present invention, comprises a plurality of chassis,
at least chassis of said plurality of chassis comprises an interior space for storing a fuel vessel, at least one transparent window opposing said interior space, and a talking mechanism.

A portable electronics device comprises a plurality of chassis,
at least chassis of said plurality of chassis comprises an interior space for storing a fuel vessel, at least one transparent window opposing said interior space, and a talking mechanism.

A portable electronics device according to a fourth aspect of the present invention, comprises:
an interior space for storing a fuel vessel;
at least one transparent window opposing the interior space; and
a display section provided at the face side where the window is provided.

Because the remaining amount of liquid fuel in the fuel vessel can be accurately grasped by directly confirming from the outside of the portable electronics device, the timing for supplementing the liquid fuel or exchanging the fuel vessel to a new fuel vessel that has accumulated an enough amount of liquid fuel, can easily be known.

Also, by not using an electronic sensor for detecting the remaining amount, the device body can be miniaturized, the manufacturing cost can be reduced, and the causes for malfunction can be reduced.

BRIEF DESCRIPTION OF THE DRAWINGS

The advantages of the present invention will become more apparent upon reading of the following detailed description and the accompanying drawings in which.

DETAILED DESCRIPTION OF THE PREFERRED EMBODIMENTS

The preferred embodiments of the present invention will be described, with reference to the drawings.

(First Embodiment)

With reference to FIGS. 1 to 6, a first embodiment will be described applying a digital camera as the portable electronics device according to the present invention.

Figure 1:
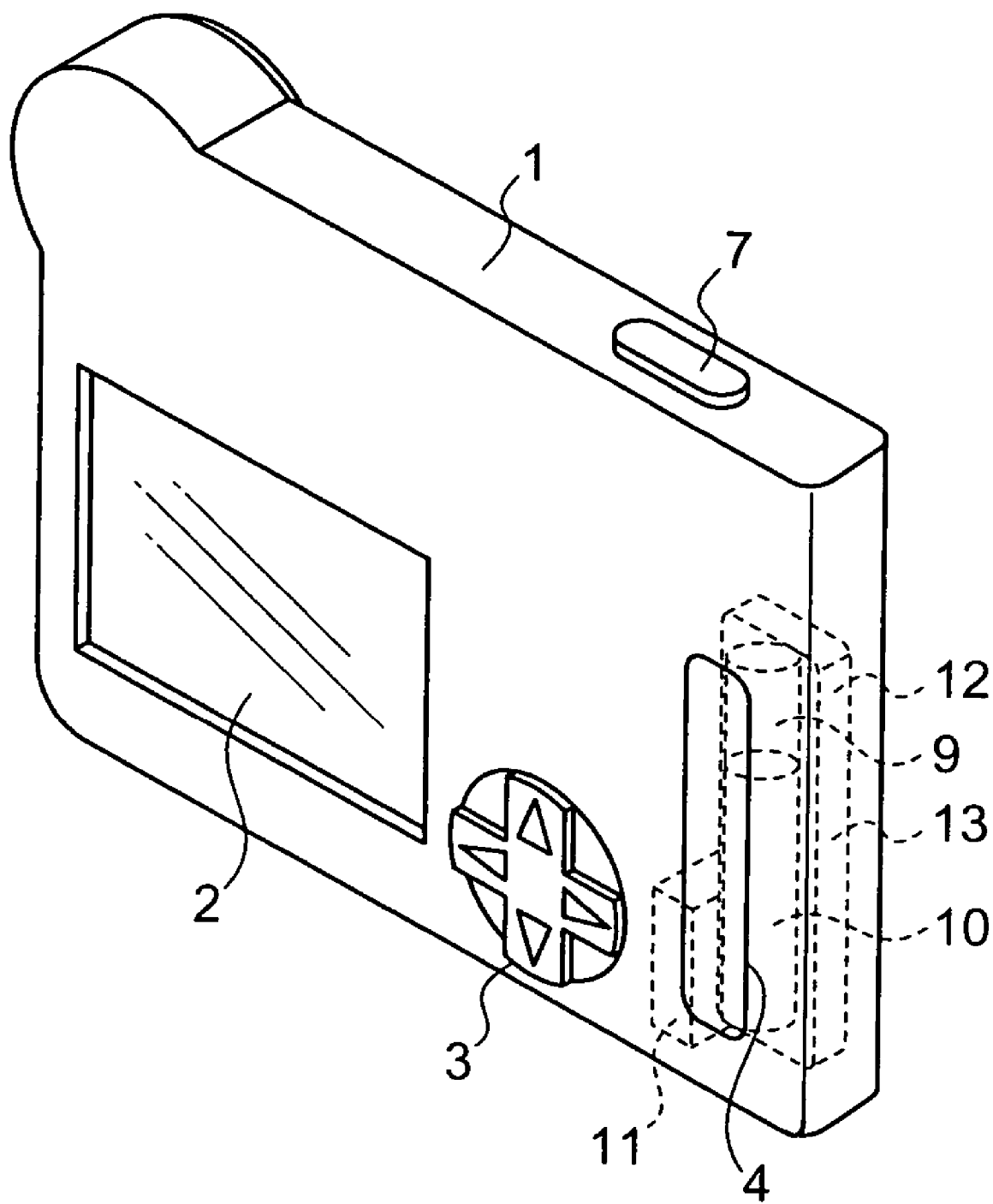
FIG. 1 is a perspective view showing a first embodiment applying a digital camera to a portable electronics device according to the present invention.
Figure 2:
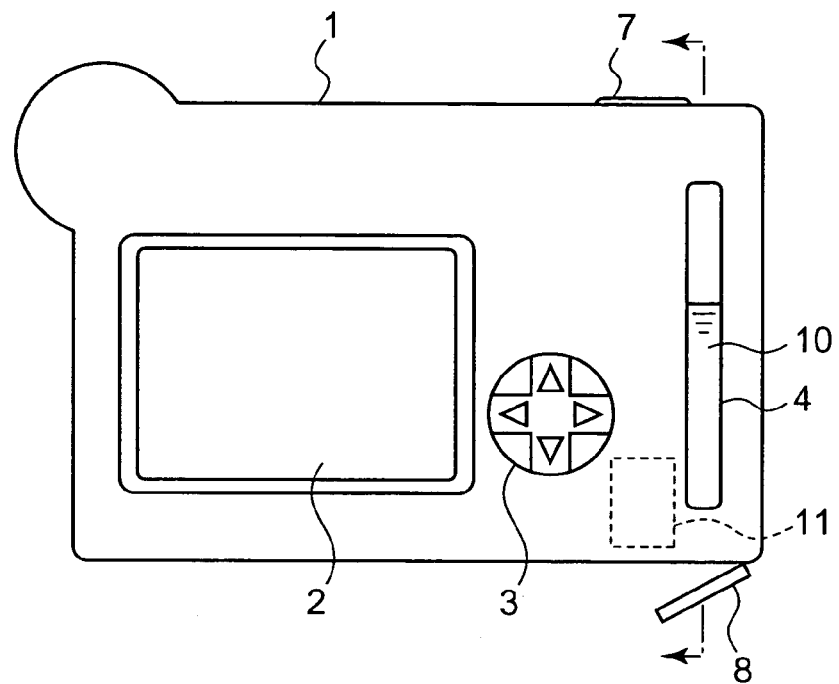
FIG. 2 is a back view showing the first embodiment applying the digital camera to the portable electronics device according to the present invention.
Figure 3:
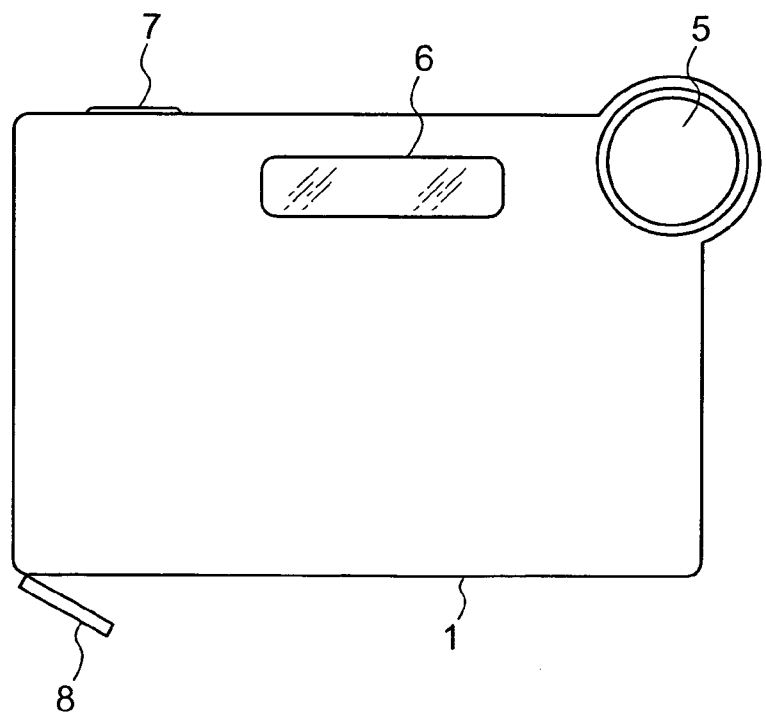
FIG. 3 is a front view showing the first embodiment applying the digital camera to the portable electronics device according to the present invention.
Figure 4:
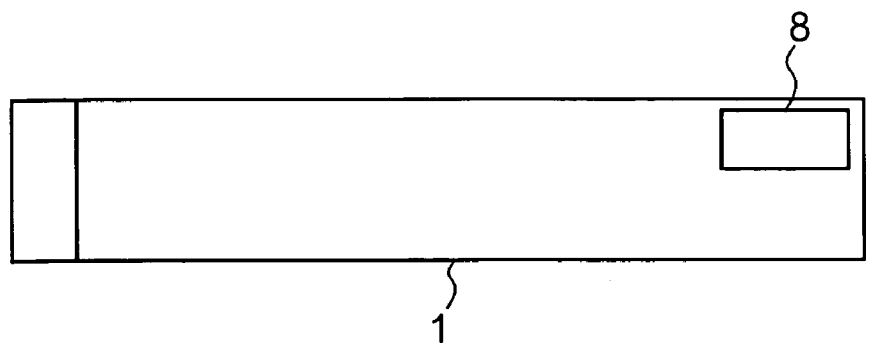
FIG. 4 is a bottom plan view showing the first embodiment applying the digital camera to the portable electronics device according to the present invention.

As shown in FIGS. 1 and 2, the digital camera of the present embodiment has a box-shaped chassis 1, and comprises a display section 2, an operation key 3, a window 4 at the back face side of the chassis 1, and an image data obtaining section 5 and a stroboscopic section 6 shown in the front face side of FIG. 3, and a photographing button 7 shown in the upper face side of FIG. 1, and a lid part 8 shown in the bottom face side of FIG. 4.

The display section 2 comprises a back light LCD (Liquid Crystal Display) panel, etc., and the liquid crystal controls the light from the back light, based on an electric signal input from a control unit (not shown), to display images photographed for preview by the image data obtaining section 5 and images, etc., photographed in accordance with instructions from the user.

A projection or a groove is formed at the operation key 3, in a cross-shape direction of a circular button, so that selection of left, right, bottom, up can be easily carried out, and is used for selecting, executing or canceling each operation, or for selecting a preview image or a photographed image in a menu screen.

The window 4 is formed at a position opposing a fuel vessel 9, which is stored inside the interior of the chassis, in an approximately rectangular shape, the perpendicular direction towards a face comprising the lid part 8 being the longitudinal side. The window 4 is formed by a transparent material. As a preferable transparent material, materials such as for example, acrylic resin, methacrylic resin, epoxy resin, polycarbonate, or glass, etc., can be used. A scale which indicates the amount of a liquid fuel 10 in the fuel vessel 9, may be marked on the face of the window 4.

The image data obtaining section 5 comprises a photographing lens made of glass or plastic, and a photographic element such as a CCD (Charge Coupled Diode) or a CMOS (Complementary Metal Oxide Semiconductor), etc., and converts the image input via the photographing lens to an electric signal with the photographing element, to generate image data. The generated image data is displayed on the display section 2.

The stroboscopic section 6 emits stroboscopic light that has the emitting timing and emitting amount controlled, to a photographic subject. The stroboscopic section 6 comprises a capacitor which accumulates electric charge in order to emit stroboscopic light, a charging circuit which charges the capacitor, and an emitting unit made of a xenon tube, etc., (all of which are not shown). At the stroboscopic section 6, voltage of the power supply supplied from the control unit is converted to a high voltage with a converter circuit, a current is supplied to the charging circuit, and electric charge, which becomes the emitting energy, is accumulated in the capacitor. As the power supply of the stroboscopic section 6, various batteries such as, stroboscopic dedicated nickel-metal-hydride batteries, may be used.

The lid part 8 is coupled to the chassis 1 by a hinge structure so that it can be opened and closed. When the lid part 8 is opened, a space where the fuel vessel 9 can be stored inside is exposed, and putting in/taking out the vessel 9 to/from the space is possible.

Figure 5:
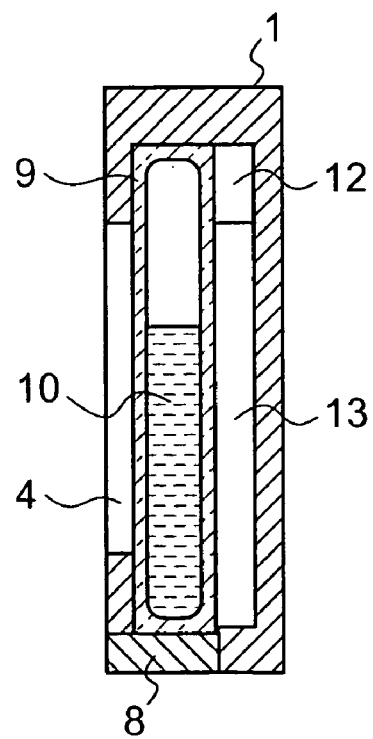
FIG. 5 is a longitudinal section view showing the first embodiment applying the digital camera to the portable electronics device according to the present invention.

In the interior of the chassis 1, shown in FIG. 1 and FIG. 5, the chassis 1 comprises a control unit, and near the periphery of the fuel vessel 9 which has a liquid fuel 10 filled, a power generation module 11 which has a power generating device which generates electric energy from liquid fuel 10 in the fuel vessel 9, a light emitting material 12, and a diffusion plate 13 are provided.

Figure 6:
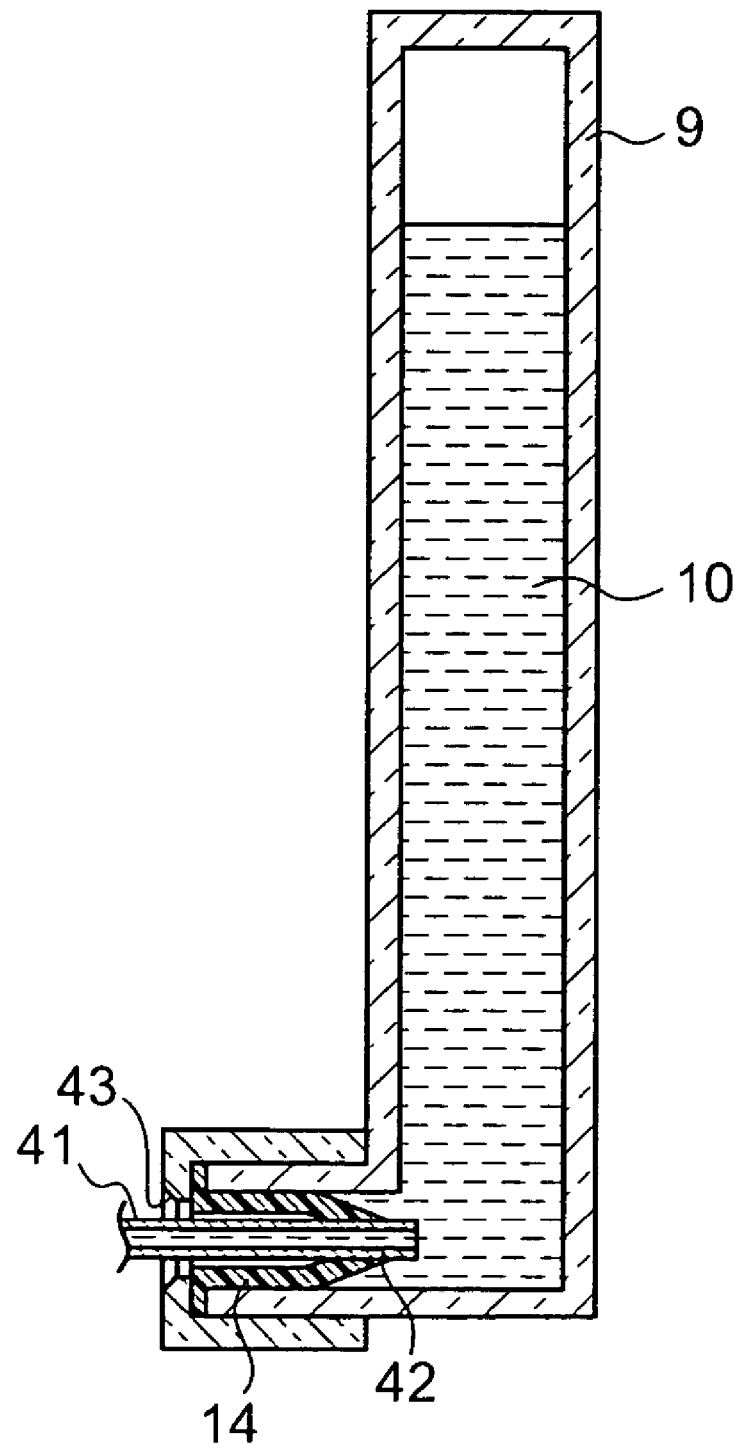
FIG. 6 is a longitudinal section view showing a fuel vessel according to the present invention.

As shown in FIG. 6, the fuel vessel 9 is an approximately cuboid shape, or an approximately circular cylinder shape, and is formed so that the parallel direction to the window 4 provided at the chassis 1 is the longitudinal direction. The fuel vessel 9 comprises a fuel supply portion 43 and a check valve 14. The liquid fuel 10 is accumulated at the lower part of the fuel vessel 9, and the boundary face (the border of the part that there is the liquid fuel 10 and the part that does not have the liquid fuel 10) moves downwards, as it is consumed. The fuel supply portion 43 is placed at a position opposing the power generation module 11, when the fuel vessel 9 is stored at the interior of the chassis 1. Because an interstice 42 of the check vessel 9 is closed in a situation where the fuel vessel 9 is not inserted to the chassis 1, the liquid fuel 10 does not leak out from the interstice 42, but in a case where the fuel vessel 9 is loaded to the space in the chassis 1 from the lid part 8, and a needle tube 41 provided in the chassis 1 enters the interior of the fuel vessel 9 from the interstice 42, the tip of the needle tube 41 contacts the liquid fuel 10, so that the liquid fuel 10 can be transmitted to the power generation module 11 from the needle tube 41.

At least a part of the fuel vessel 9 is transparent, and when the part formed by the transparent material opposes the window 4 provided in the chassis 1, the liquid fluid 10 in the fuel vessel 9 can be visible from the outside of the chassis 1. A guide groove (not shown) and a guide projection (not shown) may be provided to the fuel vessel 9 and the wall face of the chassis 1 that surrounds the interior space which stores the fuel vessel 9 respectively, to slide the guide projection to the guide grooved, in order for the transparent part of the fuel vessel 9 to adequately oppose the window 4. On the other hand, the guide projection may be provided to the fuel vessel 9, and the guide groove may be provided to the wall face. It is preferable that the guide groove and the guide projection are provided at a position where they can not be seen from the window 4, so that the remaining amount of the liquid fuel 10 can be seen better.

As a preferable transparent material of the transparent part of the fuel vessel 9, there are for example, acrylic resin, methacrylic resin, epoxy resin, polycarbonate, or glass, etc. A scale which indicates the remaining amount of a liquid fuel 10, may be marked on the face of the fuel vessel 9. It is preferable that the structure of the transparent part is long in the longitudinal direction, so that the change of the remaining amount in accordance with the consumption of the liquid fuel can be easily grasped visually, and is also preferable that the window 4 is also long in the longitudinal direction.

The light emitting material 12 irradiates light to the fuel vessel 9, in accordance with a light emitting signal output from the control unit in the chassis 1, by the operator operating the operation key 3, at a time the surrounding is dark and it is hard to see the liquid fuel 10 in the fuel vessel 9. An LED or a fluorescence tube is used as the light emitting material 12 in the present embodiment, and is provided near the periphery of the fuel vessel 9 stored at the interior of the chassis 1. As a preferable setting place, there is for example, the opposite side of the window 4 towards the stored vessel 9. At this time, it is preferable that the diffusion plate 13 is provided so that it extends to the lower side of the light emitting material 12. The light emitting material 12 is set so that it emits/does not emit light, by the operation key 3, etc., being operated.

The diffusion plate 13 is formed by materials that have bright colors, so that the light that the light emitting material 12 irradiates, enters the fuel vessel 9 evenly. As a preferable material, there are for example, white and fluorescent, etc., acrylic boards.

Figure 7:
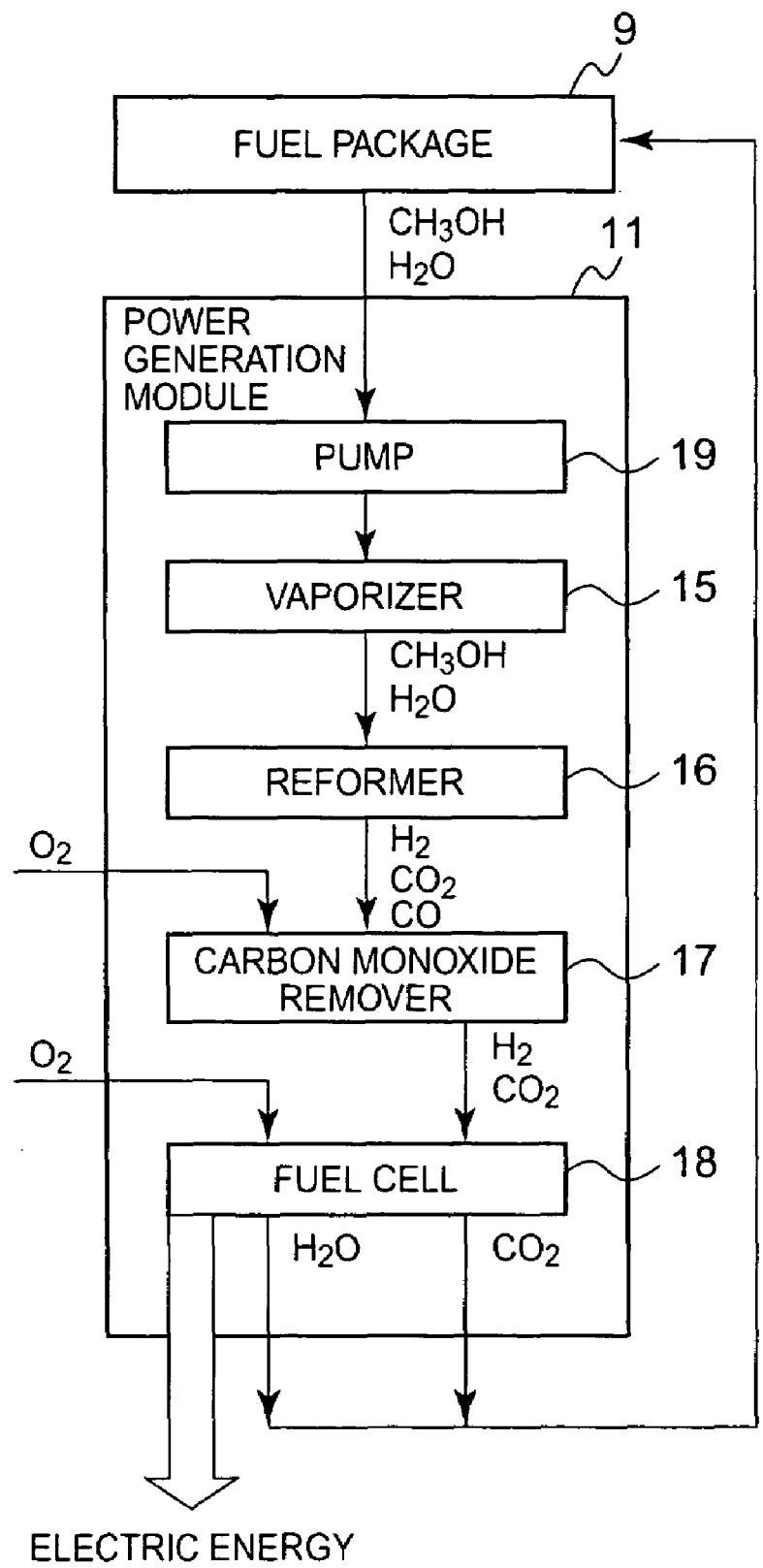
FIG. 7 is a block diagram showing the basic structure of a reform-type fuel cell according to the present invention.
Figure 8:
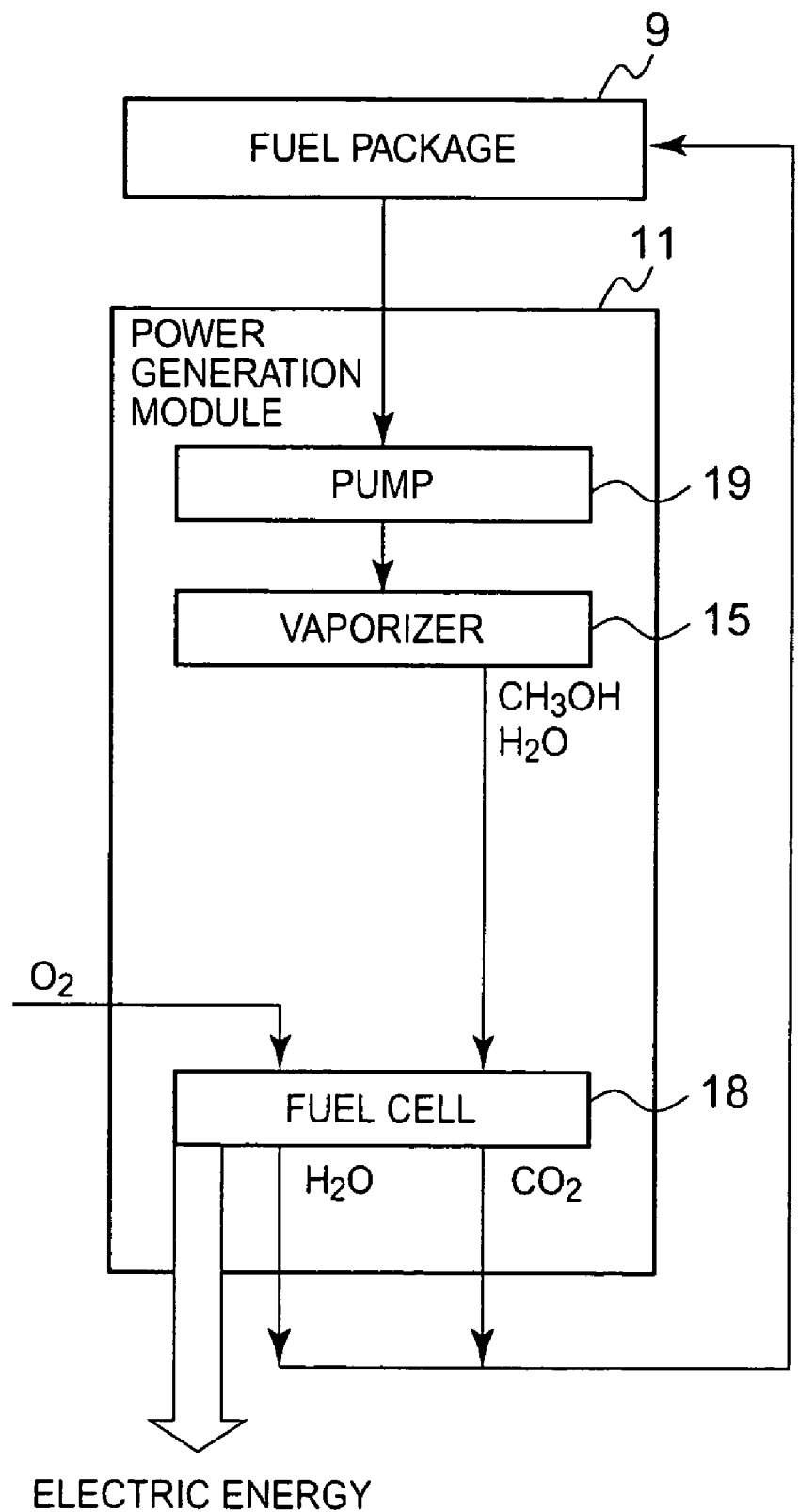
FIG. 8 is a block diagram showing the basic structure of a direct-type fuel cell according to the present invention.

Next, a power generation device used in the present invention will be described with reference to FIGS. 7 and 8. FIGS. 7 and 8 are diagrams showing the basic structure of the power generation device applying the present invention. Here, FIG. 7 is a block diagram of a fuel reforming power generation device, and FIG. 8 is a block diagram of a direct fuel power generation device, both to which the present invention can be applied.

Both power generation devices comprise a fuel vessel 9 which accumulates a liquid fluid 10 (shown in FIG. 1, etc.) and a power generation module 11 which generates electric energy from the liquid fuel 10 accumulated in the fuel vessel 9. The fuel vessel 9 is attachable and detachable to/from the power generation module 11. Also, other than the fuel vessel 9 and the power generation module 11, the power generation devices comprise an attachment structure for freely attaching and detaching the fuel vessel 9 to and from the power generation module 11.

The liquid fluid 10 is a compound liquid of chemical fuel and water. Compounds including hydrogen elements such as alcohol such as Methanol and Ethanol and gasoline, can be applied as the chemical fuel. In the present embodiment, a compound liquid of methanol and water is used as the liquid fuel 10.

As shown in FIG. 7, in the fuel reforming power generation device, the power generation module 11 comprises a vaporizer 15, a reformer 16, a carbon monoxide remover 17, and a fuel cell 18.

The liquid fuel 10 accumulated in the fuel vessel 9 is supplied to the vaporizer 15. At the vaporizer 15, the supplied liquid fuel 10 is vaporized by heat, and becomes air-fuel mixture of methanol and water (water vapor). The air-fuel mixture generated in the vaporizer 15 is supplied to the reformer 16.

In the reformer 16, hydrogen is generated by the liquid fuel 10 vaporized by the vaporizer 15. Concretely, as chemical formula (1), methanol and water vapor becoming an air-fuel mixture in the vaporizer 15 reacts by catalyst, and hydrogen and carbon dioxide are generated.

$$CH_3OH+H_2O\ 3H_2+CO \tag{1}$$

In the reformer 16, there is a case where methanol and water vapor becoming an air-fuel mixture in the vaporizer 15 is not completely reformed to carbon dioxide and hydrogen. In this case, as chemical formula (2), methanol and water vapor react, and carbon dioxide and carbon monoxide are generated.

$$2CH_3OH+H_2O\ 5H_2+CO+CO_2 \tag{2}$$

The air-fuel mixture generated in the reformer 16 is supplied to the carbon monoxide remover 17.

In the carbon monoxide remover 17, carbon monoxide is removed from the air-fuel mixture, by selectively oxidizing the carbon monoxide included in the air-fuel mixture supplied from the reformer 16. Concretely, the carbon monoxide which is specifically selected from the air-fuel mixture supplied from the reformer 16, and the oxygen in the atmosphere react by catalyst, and carbon dioxide is generated.

$$2CO+O_2\ 2CO_2 \tag{3}$$

The air-fuel mixture is supplied to a fuel electrode of the fuel cell 18 from the carbon monoxide remover 17.

At the fuel electrode of the fuel cell 18, as shown in electrochemical reaction formula (4), among the air-fuel mixture supplied from the carbon monoxide remover 17, hydrogen gas is separated into hydrogen ion and electron, receiving the influence of the catalyst of the fuel electrode. The hydrogen ion conducts to an air electrode via an ion conductive film, and the electron is removed by the fuel electrode.

$$3H_2 \rightarrow 6H^+ + 6e^- \tag{4}$$

Air is introduced and supplied to the air electrode of the fuel cell 18. Then, as shown in electrochemical reaction formula (5), the oxygen in the air, the hydrogen ion that passes the ion conductive film, and the removed electron by the fuel electrode react, and water is generated as a by-product.

$$6H^+ + 3/2O_2 + 6e^- \rightarrow 3H_2O \tag{5}$$

As the above, by the electrochemical reaction shown in the above (4) and (5), occurring in the fuel cell 18, electrical energy is generated. Air-fuel mixture of water, carbon dioxide, and air, etc., as the generated by-product is exhausted to the fuel vessel 9. A pump 19 causes the flow of the above liquid fuel 10 and the products.

As shown in FIG. 8, in the direct fuel power generation device, the power generation module 11 comprises the vaporizer 15 and the fuel cell 18.

The liquid fuel 10 supplied to the vaporizer 15 from the fuel vessel 9 is vaporized in the vaporizer 15, and becomes air-fuel mixture of methanol and water vapor. The air-fuel mixture generated in the vaporizer 15 is supplied to the fuel electrode of the fuel cell 18.

At the fuel electrode of the fuel cell 18, as shown in electrochemical reaction formula (6), the air-fuel mixture supplied from the vaporizer 15 is separated into hydrogen ion, electron and carbon dioxide, receiving the influence of the catalyst of the fuel electrode. The hydrogen ion conducts to an air electrode via an ion conductive film, and the electron is removed by the fuel electrode.

$$CH_3OH+H_2O \rightarrow CO_2+6H^++6e^- \tag{6}$$

Air is introduced and supplied to the air electrode of the fuel cell 18. Then, as shown in electrochemical reaction formula (7), the oxygen in the air, the hydrogen ion that passes the ion conductive film, and the removed electron by the fuel electrode react, and water is generated as a by-product.

$$6H^+ + 3/2O_2 + 6e^- \rightarrow 3H_2O \tag{7}$$

As the above, by the electrochemical reaction shown in the above (6) and (7), occurring in the fuel cell 18, electrical energy is generated. Air-fuel mixture of water, carbon dioxide, and air, etc., as the generated by-product is exhausted to the fuel vessel 9. The liquid fluid 10 that is accumulated in the fuel vessel 9 such as above, is mechanically fed into the vaporizer 15 by the pump 19 provided in the chassis 1. Thereafter, the pump 19 causes the flow of fluid, by the pressure difference of the gas phase fluid such as vaporized fuel and hydrogen reformed by fuel, and a valve operated at a control circuit.

Next, operation of the present embodiment will be described.

First, the lid part 8 provided at the lower end part of the chassis 1 is opened to insert the fuel vessel 9 to the interior of the chassis 1. The check valve 14 provided at the fuel vessel 9 is fit into a flow-in opening (not shown) provided at the power generation module 11, and by closing the lid part 8, the fuel vessel 9 is attached to the power generation module 11. At this time, the fuel vessel 9 is attached to the power generation module 11 so that the position of the part formed by the transparent member of the fuel vessel 9 stored at the interior of the chassis 1 and the window 4 provided at the same face as the display unit 2 match. By the liquid fuel 10 being supplied from the fuel vessel 9 to the power generation module 11 by the pump 19, electric energy is generated. By using the generated electric energy as electric power, the image obtained by the image data obtaining unit 5 is converted to an electric signal by a photographing element, and displayed at the display section 2.

At this time, without selecting a specific menu, each time an operation is carried out pressing the operation key 3, light is irradiated from the light emitting material 12 to the fuel vessel 9 for a predetermined time, and the irradiated light may be evenly diffused by the diffusion plate 13 to be radiated outside of the chassis 1 passing through the fuel vessel 9.

Because the transparent window 4 which can visually confirm the liquid fuel 10 in the fuel vessel 9 is provided at the same face side of the display section 2, the operator can easily, rapidly, and accurately confirm the remaining amount of the liquid fuel 10 in the fuel vessel 9, by visually confirming the top and bottom position of the liquid surface of the liquid fuel 10, while looking at the display section 2, i.e., while operating the digital camera.

Further, the operation key can be operated easier, by carrying out setting in order for the light to be irradiated a predetermined period to the fuel vessel 9, so that not only the user can directly visually confirm the remaining amount of the fuel 10 even in a situation where the irradiating amount of light is small, such as at night or at a dark place, but also so that the light reaches to the operation key 3.

As described above, it is possible to visually confirm the liquid fuel 10 in the fuel vessel 9 without changing the direction or position of the body. Also, unlike the conventional way, because the remaining amount of the cell is not displayed on the display section 2, it is not necessary to start the digital camera in order to confirm the remaining amount, and the time for supplying the liquid fuel 10 or changing to a new fuel vessel 9 which accumulates enough amount of the liquid fuel 10, can be easily grasped. Further, not only can the remaining amount of fuel, namely the usable power generation amount, be accurately confirmed, compared to a sensor which electrically detects the remaining cell amount, but also the miniaturization of the apparatus body is realized, and the manufacturing cost can be reduced. Further, by reducing the cause of malfunctions, troublesome maintenance can be spared.

In a case where the remaining fuel amount or remaining cell amount is detected by an electric sensor, etc., because electric power is consumed by the sensor always being driven, the consumption of the fuel in the fuel vessel 9 increases. However, in the portable electronics device of the present invention, because at a bright time, electric power is not necessary to confirm the remaining amount, the portable electronics device can be operated with low electric power consumption, and long-time consecutive use becomes possible, extending the exchanging time of the fuel vessel 9.

(Second Embodiment)

Next, a second embodiment applying a portable telephone as the portable electronics device of the present invention, will be described with reference to FIGS. 9 to 13.

Figure 9:
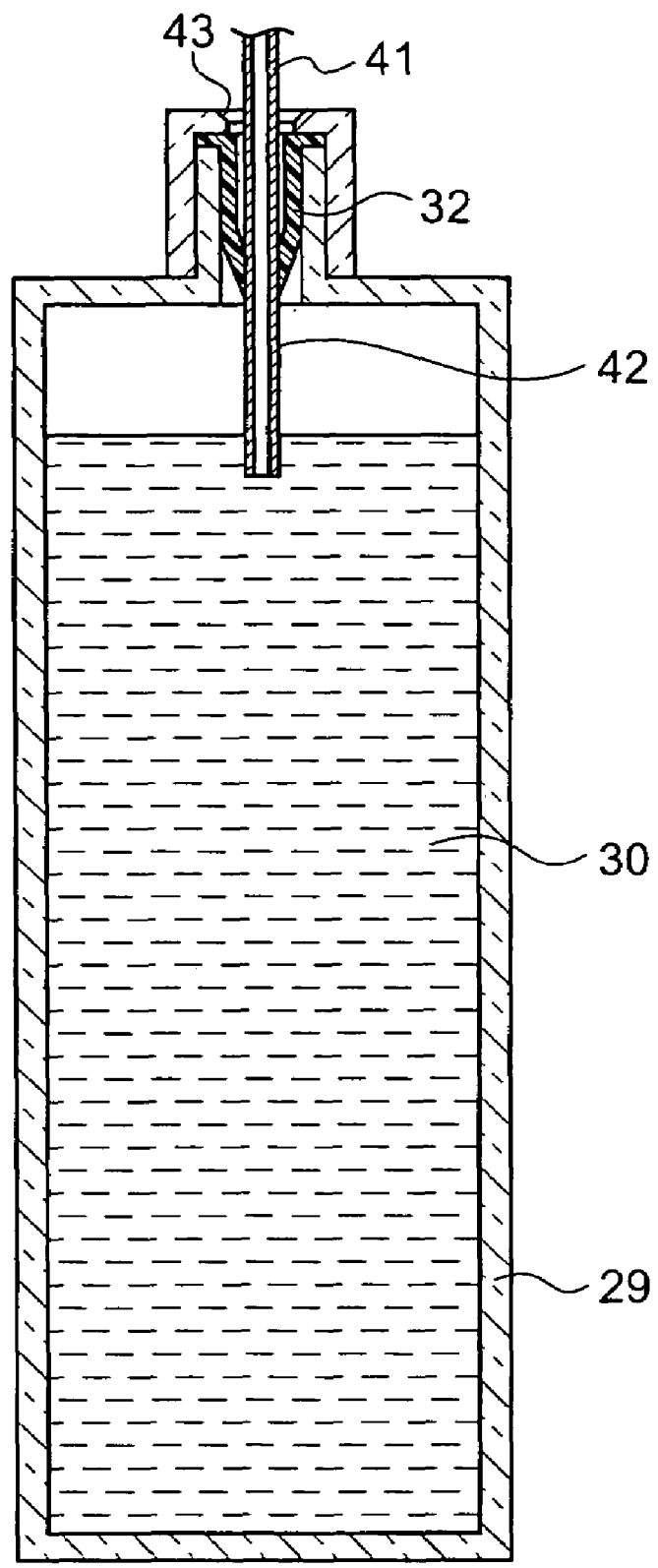
FIG. 9 is a longitudinal section view showing the fuel vessel according to the present invention.

As shown in FIG. 9, the fuel vessel 29 is an approximately cuboid shape, or an approximately circular cylinder shape, and comprises a check valve 32 at the fuel supply portion 43. A liquid fuel 30 is accumulated at the lower part of the fuel vessel 29, and the boundary face (the border of the part that there is the liquid fuel 30 and the part that does not have the liquid fuel 30) moves downwards as the fuel is consumed. Because the interstice 42 of the check valve 32 is closed in a situation where the fuel vessel 29 is not inserted to the interior of the portable terminal, the liquid fuel 30 does not leak out from the interstice 42, but in a case where the fuel vessel 29 is loaded to a space in the portable terminal, and the needle tube 41 provided in the portable terminal enters the interior of the fuel vessel 29 from the interstice 42, the tip of the needle tube 41 contacts the liquid fuel 30, so that the liquid fuel 30 can be transmitted to a power generation module 31 from the needle tube 41.

At least a part of the fuel vessel 29 is transparent, and when the part formed by the transparent material opposes a window provided in the portable terminal, the liquid fluid 30 in the fuel vessel 29 can be visible from the outside of the portable terminal. A guide groove (not shown) and a guide projection (not shown) may be provided to the fuel vessel 29 and the wall face of the portable terminal that surrounds the interior space which stores the fuel vessel 29 respectively, to slide the guide projection to the guide grooved, in order for the transparent part of the fuel vessel 29 to adequately oppose the window. On the other hand, the guide projection may be provided to the fuel vessel 29, and the guide groove may be provided to the wall face. It is preferable that the guide groove and the guide projection are provided at a position where they can not be seen from the window, so that the remaining amount of the liquid fuel 30 can be seen better.

Figure 10:
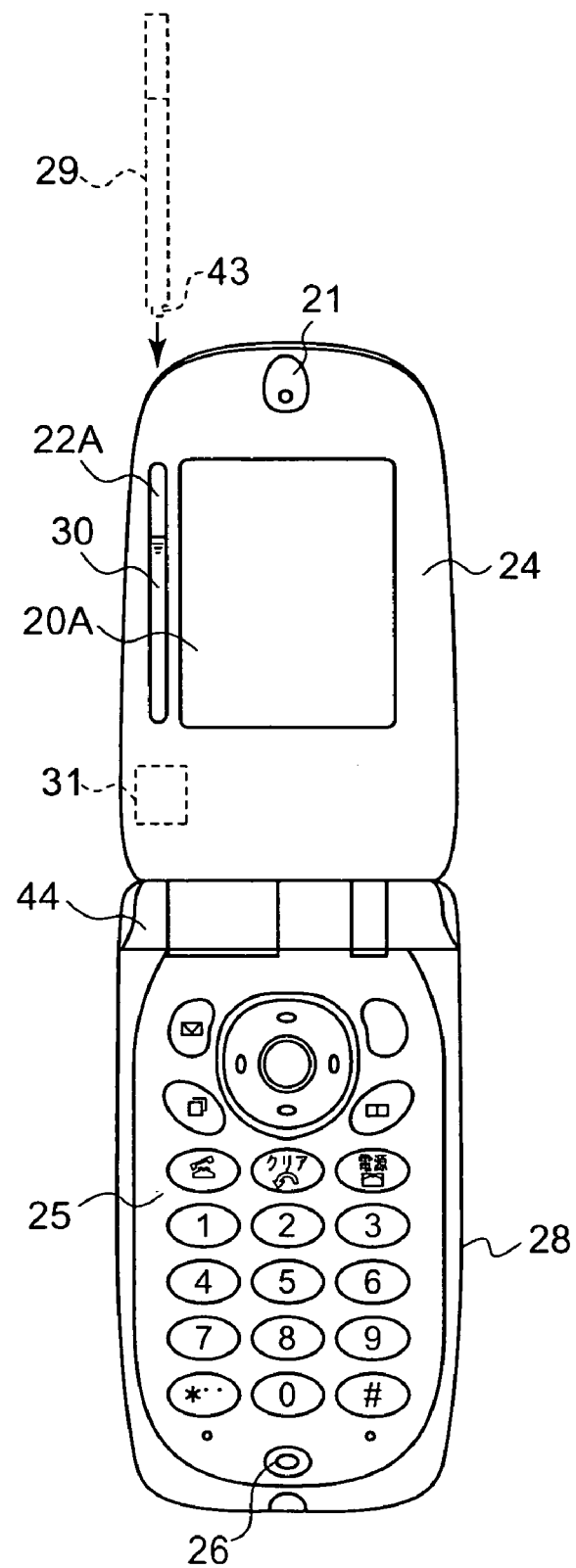
FIG. 10 is a front view showing a second embodiment applying a portable phone to the portable electronics device according to the present invention.
Figure 11:
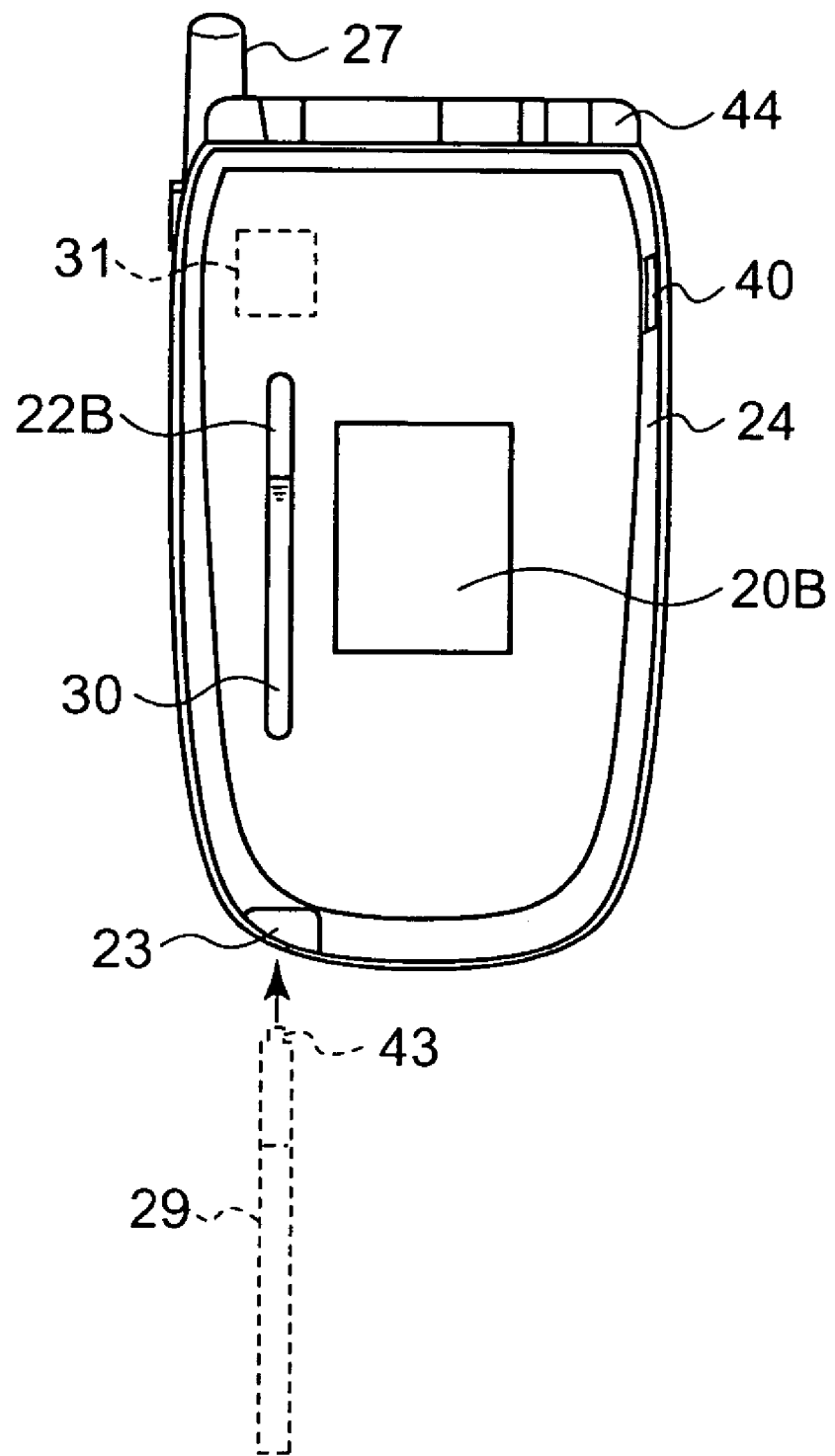
FIG. 11 is a front view showing a situation where the portable terminal according to the present invention is closed.

The portable terminal of the present embodiment is a foldable type, and as shown in FIGS. 10 and 11, comprises a first chassis 24 and a second chassis 28 connected by a hinge part 44. A main display section 20A such as a back light liquid crystal display device or an EL display device, etc., a speaker section 21 which outputs voice, and a transparent first window 22A arranged next to the main display section 20A along one long side towards the longitudinal direction of the main display section 20A are provided at the inner surface of the fist chassis 24, when the portable phone is folded, and a sub display section 20B such as a back light liquid crystal device or an EL display device, a transparent second window 22B arranged next to a sub display section 20B along one long side towards the longitudinal direction of the sub display section 20B, and a lid part 23 for storing the fuel vessel 10 at the end rim of the outside surface side, are provided at the outer face side of the first chassis 24, when the portable phone is folded. A key input section 25, a microphone section 26 for inputting voice, and an antenna section 27 are provided at the second chassis 28, which is the opposing face of the first chassis 24. A control unit (not shown) is provided at the interior of the second chassis 28.

At the interior of the first chassis 24, an interior space for storing the fuel vessel 29 is formed, and when the lid part 23 opens, the interior space is exposed, and putting in/taking out the fuel vessel 29 becomes possible. The power generation module 31 that comprises a power generation device which generates power by introducing the fuel liquid 30 from the fuel vessel 29 stored at the interior space, is provided at the bottom part of the interior space of the first chassis 24.

The main display section 20A comprises for example, a back light LCD (Liquid Crystal Display) panel, etc., and carries out display of images such as still images and moving images, and characters, based on an electric signal input from the control unit. When the telephone is not used, time information data, etc., is displayed, and when the telephone is used, telephone number data, etc., input by the input section 25 is displayed on the main display section 20A.

The sub display section 20B is smaller than the main display section 20A, and is for displaying information such as, time, date, and whether an e-mail is received or not.

The speaker section 21 comprises a speaker hole, and is connected to the control unit. By the connected control unit, the input electric signal is converted to voice, and is output through the speaker hole.

Because the transparent window 22A comprises a transparent plate of a monolayer or a multilayer of acryl, etc., and is placed at the side of the main display section 20A, as shown in FIG. 10, the observer can visually confirm the main display section 20 and the transparent window 22A at the same time, in a situation where the first chassis 24 is open.

Because the transparent window 22B comprises a transparent plate of a monolayer or a multilayer of acryl, etc., and is placed at the side of the sub display section 20B, as shown in FIG. 11, the observer can visually confirm the sub display section 20B and the transparent window 22B at the same time, in a situation where the first chassis 24 is closed.

The lid part 23 is provided at the end rim of the first chassis 24, and has a function so that it is locked at the same moment that the first chassis 24 is neared a predetermined distance towards the second chassis 28, and when the first chassis 24 is separated a predetermined distance from the second chassis 28, the lock is unlocked and the lid part 23 opens. The lid part 23 prevents the fuel vessel 29 stored inside to fly out, by malfunction.

The key input section 25 comprises various buttons such as a talk button or a numeric keypad, and a mode-switching button. When the button protruding to the outside of the second chassis 28 is operated by pressing, the button is carried out elastic deformation, and by the movable contact in the button being able to contact the fixed contact on the base so that it contacts and separates freely, an electric signal is output.

The microphone section 26 comprises a microphone hole, and is connected to the control unit. By the connected control unit, the voice input via the microphone hole is converted to an electric signal.

A part of the fuel vessel 29 is formed by a transparent material so that the liquid fuel 30 can be seen from the outside, and the fuel vessel 29 is an approximately cuboid shape or an approximately circular cylinder shape. When the fuel vessel 29 is stored in the first chassis 24, it comprises the check valve 32 at a position connecting with the power generation module 31.

A guide groove (not shown) may be provided to either the fuel vessel 29 or the wall face of the first chassis 24 that surrounds the interior space which stores the fuel vessel 29, and a guide projection (not shown) may be provided to the other of the either thereof, to slide the guide projection to the guide grooved, so that the liquid fuel 30 in the fuel vessel 29 can be seen from both the window 22A and 22B, i.e., so that of the walls that surround the periphery of the liquid fuel 30 in the fuel vessel 29, the parts of the fuel vessel 29 formed by the transparent material opposes the window 22A and 22B provided at the first chassis 24, of the walls that surround the liquid fuel 30 of the fuel vessel 29, in a case where there are places that are partially formed by a opaque material.

Because the structure of the power generation device, light emitting material, and the diffusion plate are the same as the first embodiment, the overlapping descriptions will be omitted.

Next, operation of the present embodiment will be described.

First, the lid part 23 provided at the end rim of the first chassis 24 is opened to insert the fuel vessel 29 to the interior of the first chassis 24. The check valve 32 provided at the fuel vessel 29 is fit into a flow-in opening (not shown) provided at the power generation module 31, and by closing the lid part 23, the fuel vessel 29 is attached to the power generation module 31.

At this time, as shown in FIG. 10, in a state where the first chassis 24 is open, and the main display section 20A is exposed, the remaining amount of liquid fuel 30 in the fuel vessel 29, which is stored in the first cassis 24, can be seen from the window 22A that is provided on the same surface as the main display section 20A. Namely, because the remaining amount of liquid fuel 30 can be confirmed at the same time while looking at the display content of the main display section 20A, a case where electricity can not be supplied when the fuel 30 suddenly runs short, while looking at the display content of the main display section 20A, can be prevented.

On the other hand, as shown in FIG. 11, in a situation where both the first chassis 24 and the second chassis 28 are respectively folded, and neither the display section 20A nor the window 22A can be seen, the remaining amount of the liquid fuel 30 in the fuel vessel 29 stored at the interior of the first chassis 24, can be seen from the window 22B provided on the same face as the sub display section 20B. Therefore, the remaining amount of the liquid fuel 30 can be confirmed without opening the first chassis 24, and also, the remaining amount can be confirmed even while looking at the sub display section 20B.

When the fuel vessel 29 that includes the liquid fuel 30 is attached to the interior space of the first chassis 24, in accordance with necessity, the control unit in the portable terminal supplies the liquid fuel 30 in the fuel vessel 29, by driving the pump 19 provided at the first chassis 24, to the power generation module 31, to generate electric energy. By using the generated energy as electric power, voice is converted to an electric signal, or an electric signal is converted to voice by the control unit, and functions such as talking to a third person by reception or transmission by the antenna section 27, sending/receiving e-mail, and displaying, etc., on the main display section 20A and sub display section 20B, become possible.

In an environment where the surrounding is dark, in a situation such as shown in FIG. 10, in a case where the key input section 25 is operated, or the first chassis 24 is opened to a predetermined place, towards the second chassis 28, the back light of the liquid crystal display device of the main display section 20A or the EL display device may be controlled to emit light automatically, so that the remaining amount of the liquid fuel 30 in the fuel vessel 29 can be seen from the window 22A by that light.

The light at this time may take a light path reaching to the fuel vessel 29 from the light source used in the main display section 20A, propagating through the first chassis 24, or the light may take a light path transmitting out of main display section 20A as a display light, and into the window 22A.

In the same way, in a situation shown in FIG. 11, a switch 40 provided at the side of the first chassis 24 may be pushed to emit the backlight of the liquid crystal display device of the sub display section 20B or the EL display device, so that the remaining amount of fuel 30 in the fuel vessel 29 can be seen from the window 22B, by that light. The light at this time may take a light path reaching the fuel vessel 29 by propagating from the light source used in the sub display section 20B to the interior of the first chassis 24, or a light path of penetrating the window 22B as the display light, after going out of the sub display section 20B.

Therefore, because the liquid surface of the liquid fuel 30 accumulated in the fuel vessel 29 can be visually confirmed moving from top to bottom in the longitudinal direction, the remaining amount of the liquid fuel 30 in the fuel vessel 29 can be easily confirmed visually without installing an electric sensor, etc. Also, by the window 22B being provided at the opposite side of the display section, the remaining amount of the liquid fuel 30 in the fuel vessel 29 can be visually confirmed without opening/closing the first chassis 24 and the second chassis 28.

Further, if it is set so that the lid part 23 is maintained locked, in the folded state, the fuel vessel 29 stored at the interior of the first chassis 24, flying out, can be prevented.

As the above, according to the portable terminal of the present embodiment, the remaining amount of the liquid fuel 30 in the fuel vessel 29 can be confirmed, in a state where the portable terminal is folded, and the trouble of opening/closing the first chassis 24 and the second chassis 28 can be spared. Further, even in a situation where the first chassis 24 is opened, the remaining amount of the liquid fuel 30 in the fuel vessel 29 can be confirmed by looking at the main display section 20A of the portable terminal. In this way, because an electrical remaining amount detection sensor is not used, miniaturization of the apparatus body is realized, and the manufacturing cost can be reduced. Further, by reducing the cause of malfunctions of the electric control such as the sensor, troublesome maintenance can be spared. Furthermore, by having a function for preventing the fuel vessel 29 to fall out, at the time the portable phone is folded, the portable terminal can be stored in a pocket, etc., without paying attention to the direction of the portable terminal.

Figure 12:
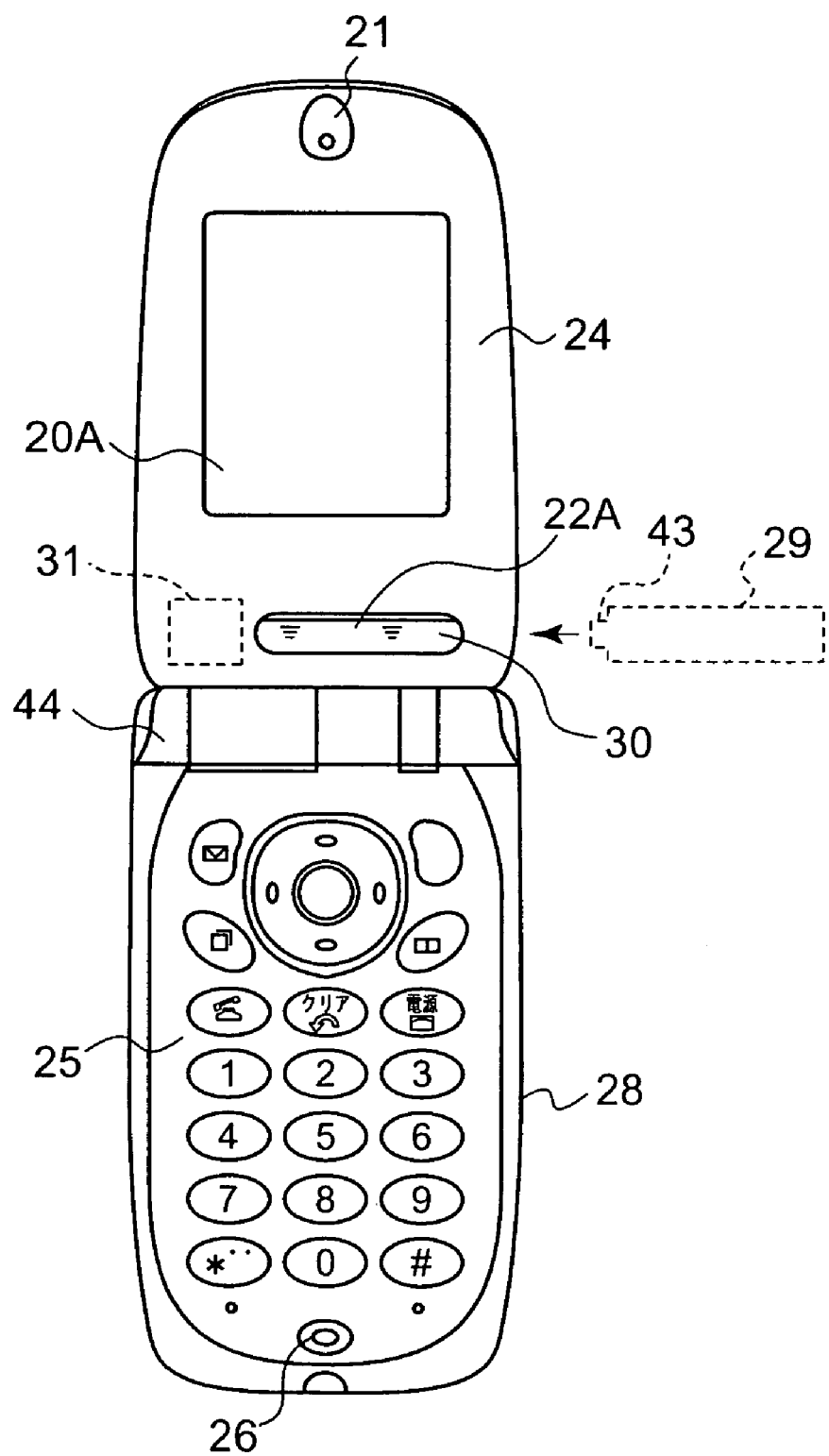
FIG. 12 is a front view showing a modified example of the second embodiment applying the portable phone to the portable electronics device according to the present invention.
Figure 13:
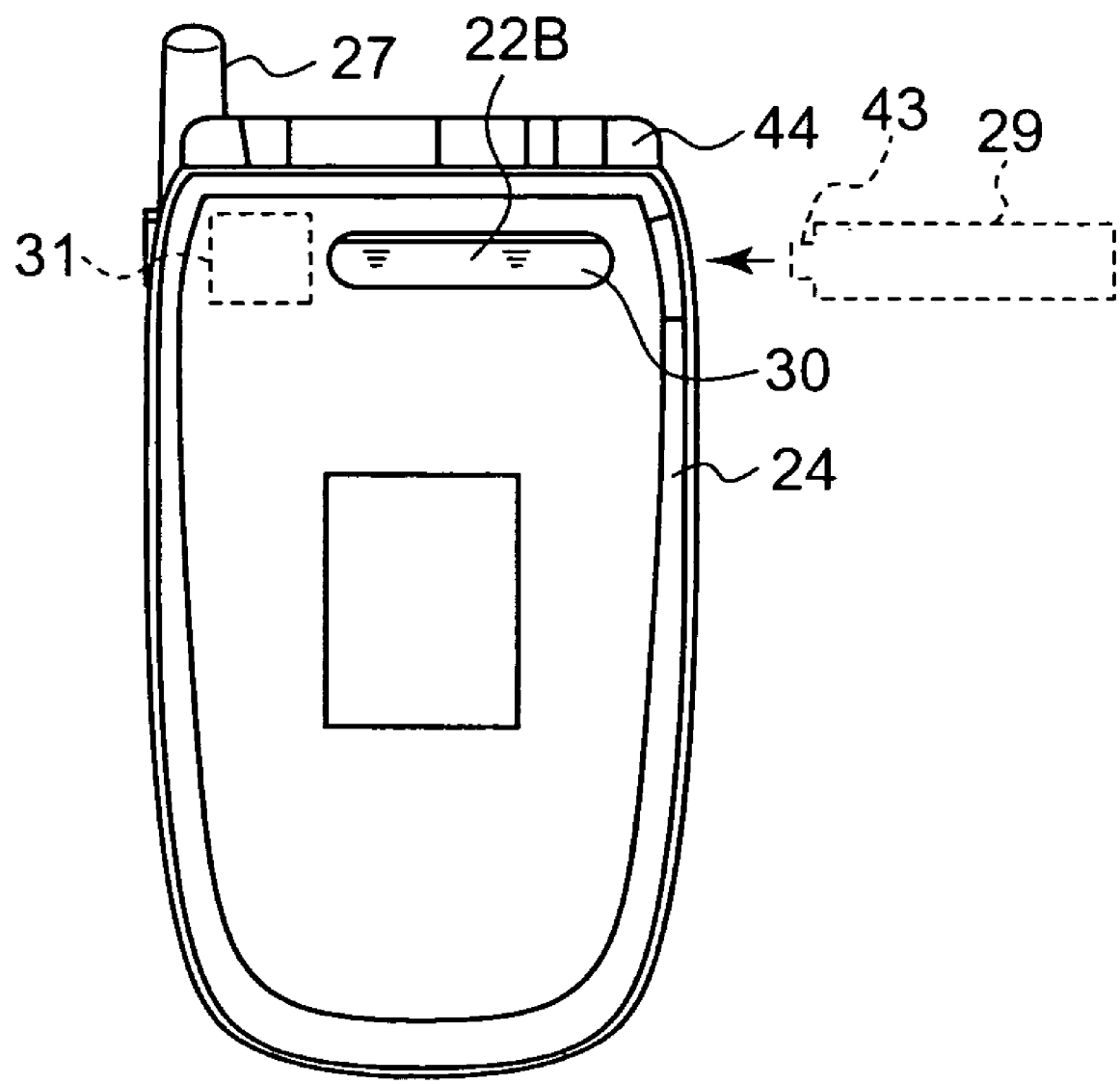
FIG. 13 is front view showing the portable terminal according to the present invention, in a closed state.

As a modified example of the above embodiment, a structure such as shown in FIGS. 12 and 13 can be applied. In the situation shown in FIG. 12, because inserting in/taking out the fuel vessel 29 to/from the first chassis 24 from a lateral direction is carried out by opening the lid part 23 provided either above or below the main display section 20A and the sub display section 20B, the display area of a lateral direction of the main display section 20A and the sub display section 20B can be widely obtained. Effects of the functions, etc., for preventing the fuel vessel 29 to fly out, when the portable terminal is folded, is the same as the above embodiment.

In the above embodiment, the interior space for inserting the fuel vessel 29 to the first chassis 24, and the lid part 23 are provided at the first chassis 24. However, the interior space for inserting the fuel vessel 29 to the first chassis 24, and the lid part 23 may be provided at the second cassis 28. In this case, as the light source for irradiating liquid fuel 30 in the fuel vessel 29 when the surrounding is dark, LED provided in the second chassis 28 may be used to emit light to the key input section 25.

Also, in the above embodiment, the portable terminal is a foldable type. However, the portable terminal may have a structure so that there is a part where the first chassis 24 and the second chassis 28 overlap, and the main display section 20A is exposed by sliding either the first chassis 24 or the second chassis 28.

(Third Embodiment)

A third embodiment applying a laptop computer to the portable electronics device according to the present invention, will be described.

Figure 14:
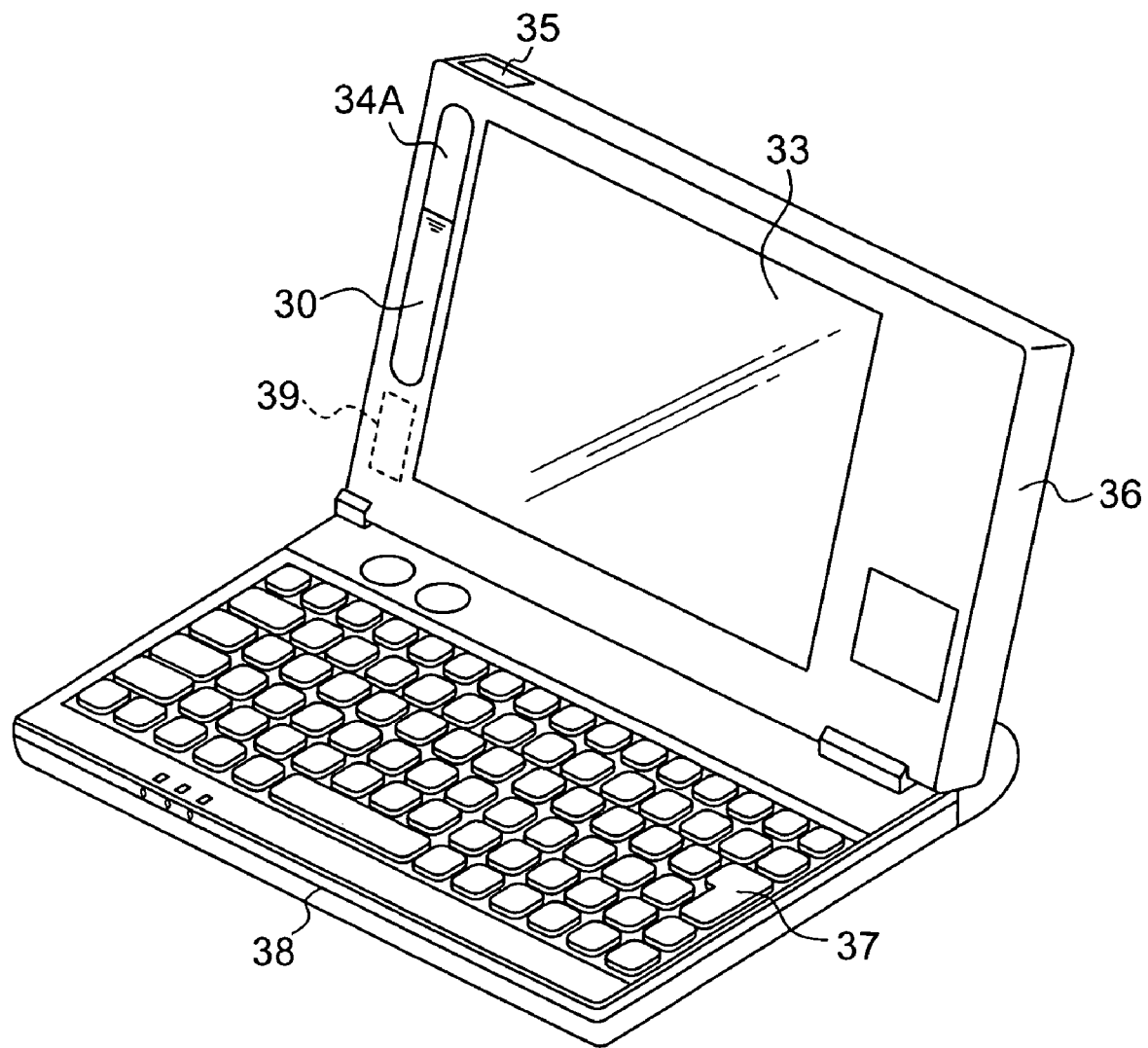
FIG. 14 is a perspective view showing a third embodiment applying a laptop computer to a portable electronics device according to the present invention.
Figure 15:
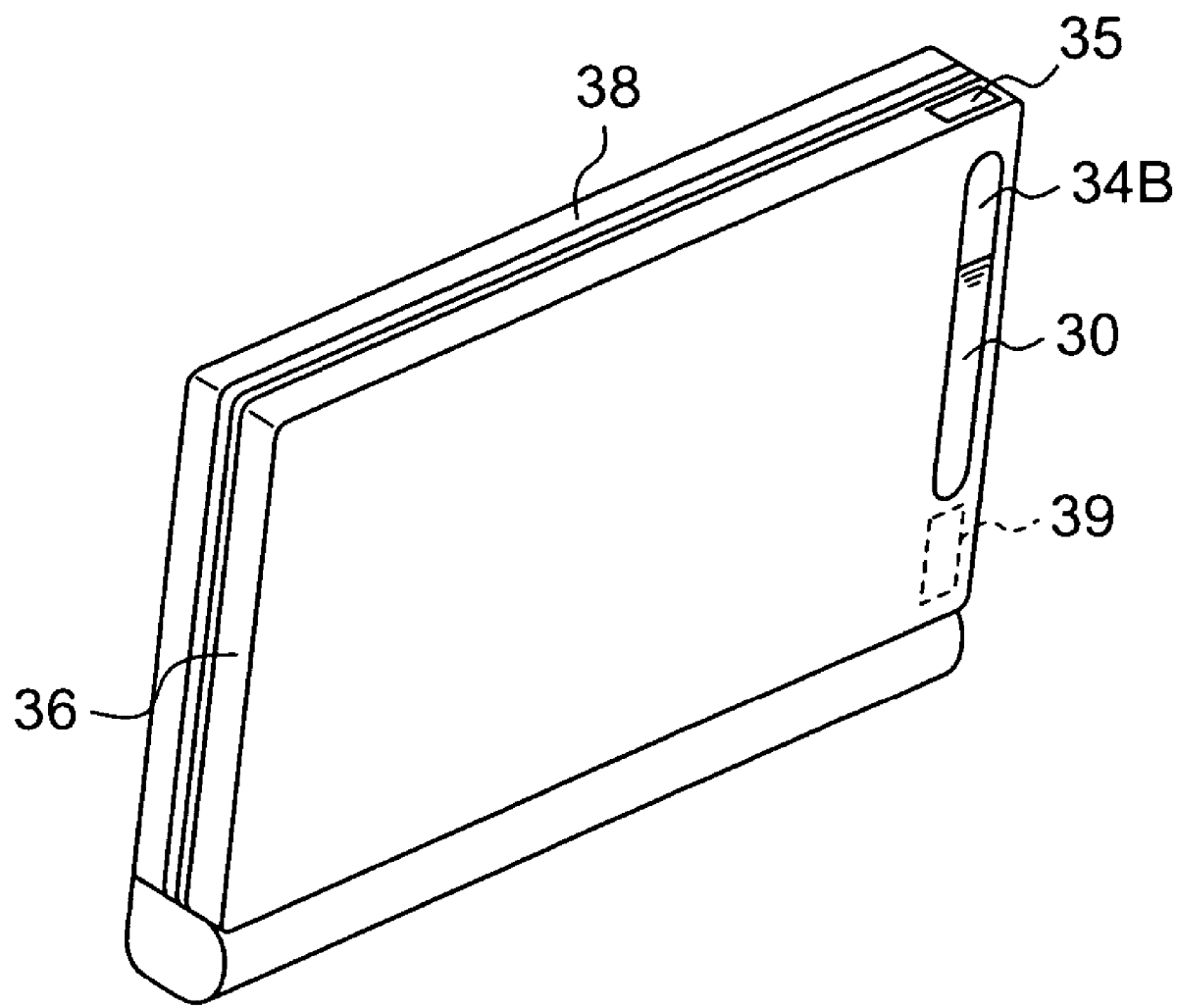
FIG. 15 is a perspective view showing the laptop computer according to the present invention, in a closed state.

As shown in FIGS. 14 and 15, the laptop computer of the present embodiment comprises a first chassis 36 that includes a display section 33, a first window 34A placed on the same face as the display section 33, a lid part 35 at the end rim for inserting/taking out the fuel vessel 29, a second window 34B provided at the face of the opposite side of the display section 33, and a second chassis 38 that includes an input section 37. The first chassis 36 and the second chassis 38 are connected by a hinge structure.

At the interior of the first chassis 36 shown in FIG. 14, an interior space is formed, and near the periphery of the fuel vessel 29 that accumulates the liquid fuel 30, which is stored in the interior space, a power generation module 39, a light emitting material (not shown), and a diffusion plate (not shown) in the same way as the first embodiment, are provided, and at the interior of the second chassis 38, a control unit (not shown) is provided.

The display section 33 comprises a back light LCD (Liquid Crystal Display) panel, etc., and the liquid crystal controls the light from the back light, based on an electric signal input from the control unit, to display character information or images, etc.

The lid part 35 is provided at the end rim of the first chassis 36, and has a function so that it is locked at the same moment that the first chassis 36 is neared a predetermined distance towards the second chassis 38, and when the first chassis 36 is separated a predetermined distance from the second chassis 38, the lock is unlocked and the lid part 35 opens. The lid part 35 prevents the fuel vessel 29 stored inside to fly out, by malfunction. Namely, in a case where the electric apparatus of the present invention is inside a bag, etc., in a folded state, such as shown in FIG. 15, the fuel liquid 30 does not leak, because the lid part 35 can not mistakenly open in a state where the first chassis 36 is closed.

The input section 37 comprises various buttons such as a talk button or a numeric keypad, and a mode-switching button. When the button protruding to the outside of the second chassis 38 is operated by pressing, the button is carried out elastic deformation, and by the movable contact in the button being able to contact the fixed contact on the base so that it contacts and separates freely, an electric signal is output.

The control unit comprises calculating means such as a CPU (Central Processing Unit) etc., and storing means such as a memory, etc., and performs process and calculation of the electric signal input by cooperating with the software read by the computer.

Because the descriptions for the fuel vessel 29, the power generation device, the light emitting material, and the diffusion plate are the same as the second embodiment, the overlapping parts will be omitted.

Next, operation of the present embodiment will be described.

First, as shown in FIG. 14, the lid part 35 is opened after the display section 33 is exposed by opening the computer. The fuel vessel 29 is inserted to the interior space of the computer, and the check valve 32 provided at the fuel vessel 29 is fit into a flow-in opening provided at the power generation module 39. By closing the lid part 35, the fuel vessel 29 is attached to the power generation module 39. At this time, the transparent part of the fuel vessel 29 is arranged opposing the transparent first window 34A made of acryl, etc., provided at the same face as the display section 33.

When the fuel vessel 29 that includes the liquid fuel 30 is attached to the interior space of the first chassis 36, in accordance with necessity, the control unit in the computer supplies the liquid fuel 30 in the fuel vessel 29, by driving the pump 19 provided at the first chassis 36, to the power generation module 39, to generate electric energy. By using the generated energy as electric power, the computer executes processing at the control unit in accordance with the operation by the input section 37 or the signal received from outside, to display the result to the display section 33.

Or, in a state where the power source is on, light may be irradiated from the light source of the display section 33 to the fuel vessel 29, and the irradiated light may be evenly diffused by the diffusion plate, to be radiated outside the first chassis 36, passing thorough the fuel vessel 29.

Therefore, by just placing the computer at a horizontal place such as a desk, etc., the change in the top and bottom position of the liquid fuel 30 accumulated in the fuel vessel 29 can be visually confirmed, and the remaining amount of the liquid fuel 30 in the fuel vessel 29 can easily be visually confirmed, without loading an electric sensor, etc. Also, be providing the first window 34A on the same face as the display section 33, the liquid fuel 30 in the fuel vessel 29 is always in sight, when the computer is used, and the remaining amount can be known easily and accurately.

Also, as shown in FIG. 15, because the remaining amount of the liquid fuel 30 in the fuel vessel 29 can be seen from the second window 34B, even in a folded state, the remaining amount can be detected without opening the computer or electrically driving the computer.

Further, because the lid part 35 is maintained in a locked state, in a situation where the laptop computer is folded, the fuel vessel 29 stored at the interior of the first chassis 36 flying out can be prevented.

Furthermore, by the light being irradiated to the fuel vessel 29 from the light source of the display section 33, without pressing a specific button that the input section 37 comprises, the liquid fuel 30 can be directly visually confirmed with ease, even in a situation where the irradiating amount of light is small, such as at night or at a dark place, etc.

As the above, according to the present embodiment, because the laptop computer comprises the first window 34A on the same face as the display section 33, the remaining amount can be visually confirmed accurately, just by placing the laptop computer at a position where the display section 33 is viewed. Also, by realizing the miniaturization of the main body, the manufacturing cost can be reduced, and in addition, the cause of malfunctions can be reduced. Therefore, the trouble of maintenance can be spared. Because a function for preventing the fuel vessel 29 fly out, the laptop computer can be stored in a bag, etc., without paying attention to the direction of the laptop computer. Further, because the remaining amount of cell is not read electrically, a remaining amount sensor or a circuit for receiving/sending the remaining amount data are not necessary, and the manufacturing cost can be reduced.

In the above embodiment, the display section is not provided at the side of the second window 34B. However, the display section may be provided as a sub display section.

Various embodiments and changes may be made thereunto without departing from the broad spirit and scope of the invention. The above-described embodiments are intended to illustrate the present invention, not to limit the scope of the present invention. The scope of the present invention is shown by the attached claims rather than the embodiments. Various modifications made within the meaning of an equivalent of the claims of the invention and within the claims are regarded to be in the scope of the present invention.

This application is based on Japanese Patent Application No. 2003-338385, filed on Sep. 29, 2003, and including specification, claims, drawings and summary. The disclosure of the above Japanese Patent Application is incorporated herein by reference in its entirety.

What is claimed is:

1. A portable electronic device, comprising:
   a chassis that includes an interior space into which an exchangeable fuel vessel is insertable, and at least one transparent window which opposes the interior space;
   a fuel cell that generates power from fuel stored in the fuel vessel; and
   a light source for irradiating light into the fuel vessel to emit light outwardly from the fuel vessel through the transparent window;
   wherein at least a part of the fuel vessel that opposes the transparent window is transparent; and
   wherein a scale which indicates a remaining amount of the fuel stored in the fuel vessel is marked on the fuel vessel.

2. The portable electronic device according to claim 1, further comprising a diffusion plate for diffusing the light irradiated from said light source.

3. The portable electronic device according to claim 1, further comprising a display section placed on a same face of said chassis as said window.

4. The portable electronic device according to claim 1, wherein:
   said chassis comprises a first display section provided at a predetermined face, and a second display section provided at an opposite face that is opposite to said predetermined face; and
   said at least one window comprises a first window provided at said predetermined face, and a second window provided at said opposite face.

5. The portable electronic device according to claim 1, wherein said chassis further comprises an operation key.

6. The portable electronic device according to claim 1, wherein said portable electronic device comprises one of a digital camera, a portable telephone, and a laptop computer.

7. A portable electronic device including a chassis, wherein the chassis comprises:
   an interior space into which an exchangeable fuel vessel is insertable;
   at least one transparent window opposing said interior space;
   a photographing element that photographs an image;
   a display section provided at a face of said chassis where said window is provided; and
   a light source for irradiating light into the fuel vessel to emit light outwardly from the fuel vessel through the transparent window.

8. The portable electronic device according to claim 7, wherein said display section displays the image photographed with said photographing element.

9. The portable electronic device according to claim 7, further comprising a fuel cell which generates power using the fuel in said fuel vessel.

10. A portable electronic device comprising:
- a plurality of chassis, including a first chassis and a second chassis;
- wherein the first chassis comprises an interior space into which an exchangeable fuel vessel is insertable, at least one transparent window opposing said interior space, a talking mechanism, a fuel cell which generates power using fuel stored in the fuel vessel, and a light source for irradiating light into the fuel vessel to emit light outwardly from the fuel vessel through the transparent window; and
- wherein the at least one transparent window comprises a first window which is provided at one face of the first chassis and which is exposed when the one face of the first chassis is opened with respect to the second chassis.

11. The portable electronic device according to claim 10, wherein the first chassis further comprises a display section which is exposed when the one face of the first chassis is opened, and said at least one window comprises a second window provided at a face opposite to the one face of the first chassis at which the first window is provided.

12. The portable electronic device according to claim 10, wherein:
- the first chassis further comprises a first display section which is exposed when the one face of the first chassis is opened and a second display section which is provided at a face opposite to said one face; and
- the at least one transparent window further comprises a second window provided at the face opposite to the one face at which the first window is provided.

13. The portable electronic device according to claim 10, wherein the first chassis and the second chassis are connected by a structure such that the first chassis and the second chassis can be freely folded.

14. The potable electronic device according to claim 10, further comprising a display section provided on the one face at which said first window is provided.

15. A portable electronic device including at least one chassis, wherein the chassis comprises:
- an interior space into which an exchangeable fuel vessel is insertable;
- at least one transparent window opposing the interior space;
- a display section provided at a face of the chassis where said window is provided;
- a fuel cell which generates power using fuel stored in the fuel vessel; and
- a light source for irradiating light into the fuel vessel to emit light outwardly from the fuel vessel through the transparent window.

16. The portable electronic device according to claim 15, wherein the portable electronic device comprises a plurality of chassis, including a first chassis and a second chassis.

17. The portable electronic device according to claim 15, wherein the portable electronic device comprises a first chassis and a second chassis, and said display section is exposed when one face of said first chassis is opened with respect to the second chassis.

18. The portable electronic device according to claim 15, wherein the portable electronic device comprises a first chassis and a second chassis, and said display section is exposed when one face of said first chassis is opened with respect to the second chassis; and
- wherein said at least one window comprises a first window which is exposed when said one face is opened, and a second window provided at a face opposite to the face at which the first window is provided.

19. The potable electronic device according to claim 15, wherein the portable electronic device comprises a first chassis and a second chassis, and the first chassis and the second chassis are connected by a structure such that the first chassis and the second chassis can be freely folded.

* * * * *